Feb. 13, 1951

D. E. DAVIDSON 2,541,575

PHOTOGRAPHIC SLIDE BINDER

Filed Nov. 1, 1948

DONALD E. DAVIDSON,
INVENTOR.

BY
*Forrest J. Lilly*
ATTORNEY.

Patented Feb. 13, 1951

2,541,575

UNITED STATES PATENT OFFICE 2,541,575

PHOTOGRAPHIC SLIDE BINDER

Donald E. Davidson, Los Angeles County, Calif.

Application November 1, 1948, Serial No. 57,713

2 Claims. (Cl. 40—158)

This invention relates generally to mounts or binders for photographic transparency slides.

The invention is particularly applicable to a well known type of photographic positive transparency slide, which is usually in color, and in various conventional sizes, such as 2" x 2", or 2¼" x 2¼", to be projected onto a viewing screen by means of a suitable slide projector. Such a transparency has a thin and flexible transparent Celluloid base, and it is the practice to mount them between thin sheets of flat transparent glass which are in turn secured in assembly by means of a binder frame.

It is the practice to feed these slide binders, with the contained transparencies, one after the other edgewise through a guideway leading through the focal plane of the projector. After the projection of one slide which has been centered in this guideway, it is then shoved along toward the exit end of the guideway simply by edge engagement of its slide binder by the next binder as the latter is advanced toward the projection position.

Objects of the present invention include the provision of a simple and improved slide binder capable of securely and satisfactorily mounting a positive transparency between a pair of glass plates, one which is inexpensive to manufacture, is especially easy to assemble and disassemble, affords a high degree of protection to the glass plates and transparency, is durable, permanent, facilitates feeding through the projector, and one which, finally, presents a wide flat surface adaptable to the reception of titling indicia.

The invention will be best understood without further preliminary discussion by referring now to the following detailed description of a present illustrative embodiment thereof, reference for this purpose being made to the accompanying drawings, in which.

Figure 1:
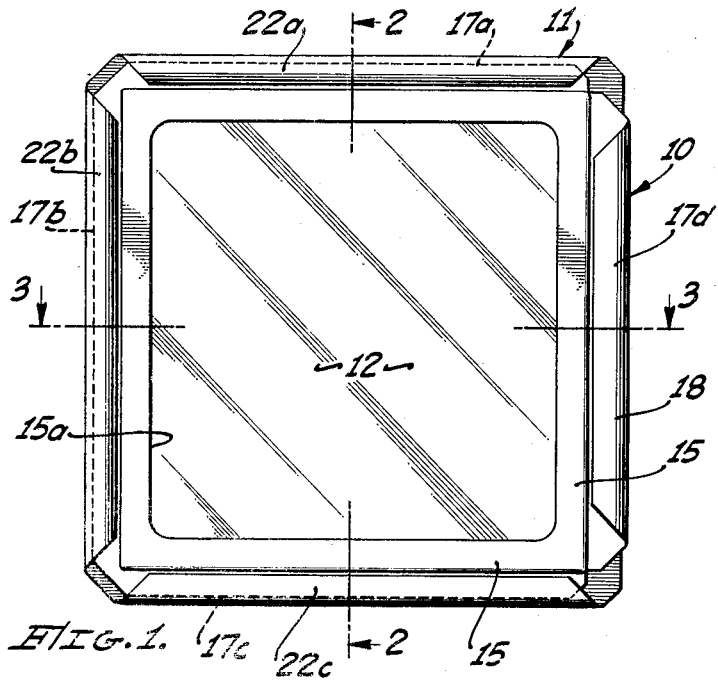
Figure 1 is a side elevation of the assembled slide binder.
Figure 2:
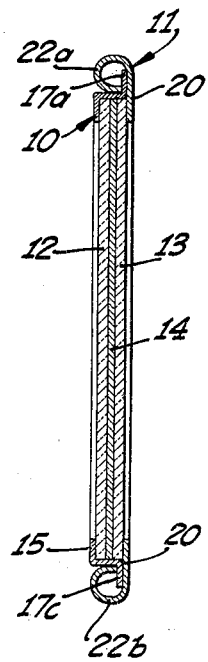
Figure 2 is a transverse section on line 2—2 of Figure 1.

In the drawings, numerals 10 and 11 designate the two parts of the slide binder of the invention, these preferably being made of thin sheet metal, for instance of a thickness of .010", and being adapted to enclose between them two flat glass plates 12 and 13, and the positive transparency 14 sandwiched between the latter.

Figure 3:
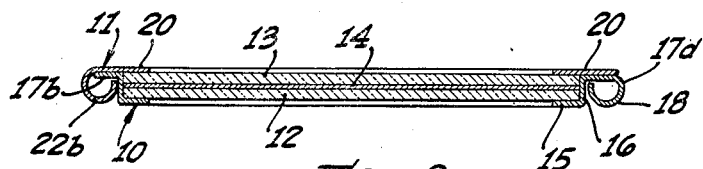
Figure 3 is a transverse section on line 3—3 of Figure 1.
Figure 7:
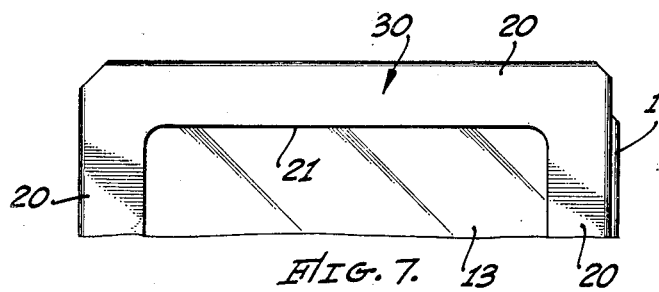
Figure 7 is a fragmentary view showing a portion of the face of the slide binder opposite to that appearing in Figure 1.
Figure 6:
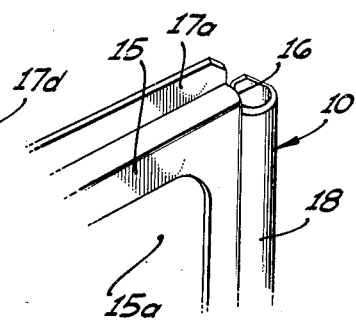
Figure 6 is a perspective detail showing the corner construction of the slide binder.
Figure 4:
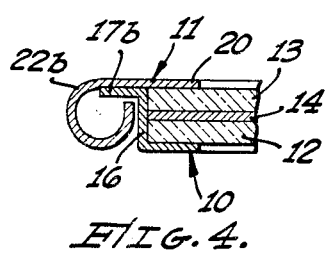
Figures 4 and 5 are enlarged details taken from Figure 3.

The part 10, which may be regarded as the receptacle for the plates and transparency, comprises a rectangular frame having four side strips 15 defining a rectangular opening 15a and adapted to overlap narrow marginal portions of the side surface of the adjacent glass plate 12, and having narrow edge wall portions 16 extending from and formed at right angles to side strips 15, so as to abut the edges of the glass plates all around. On three sides the wall portions 16 are formed at the top (as viewed in Figure 3) with short outwardly turned flanges 17a, 17b and 17c, respectively, all formed at right angles to wall portions 16, and the fourth wall portion 16 has a longer, outwardly turned flange portion 17d which is extended and rolled under, as indicated at 18, its extremity coming nearly or substantially into abutment with the underside of the flange immediately adjacent the wall portion 16. The vertical thickness of this roll 18 is preferably substantially the width of the wall 16, so that the underside of the roll is substantially in the plane of the frame sides 15.

The depth of the plate receiving receptacle formed by the frame member 10 as thus described is equal to the thickness of the two plates 12 and 13 plus the thickness of the transparencies 14, or a few thousandths under. For example, but without intention of limiting the invention, the two glass plates may be .040" each, and the transparency 14 may be about .008", giving a total thickness of .088" (approximately). The depth of the receptacle may then preferably be approximately .085", the reason for the excess appearing presently.

Figure 5:
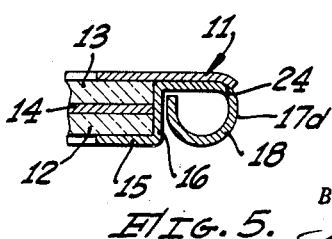

The other binder part 11, which may be regarded as the closure member, comprises a rectangular frame having four side strips 20 defining a rectangular opening 21 matching the opening 15a of the binder part 10, these side strips 20 being adapted to overlap narrow marginal portions of the side surface of the adjacent glass plate 13, as well as to engage against the flanges 17a, 17b, 17c and 17d of binder part 10. The outside edges of the strips 20 on three sides of the frame are extended and rolled under, forming three rolled edges 22a, 22b and 22c which are adapted to curl around the three flanges 17a, 17b and 17c, respectively, on the binder part 10 and to engage tightly against the undersides of said flanges. The edges of the flanges 17a, 17b and 17c are adapted to extend inside the rolled edges 22a, 22b and 22c, and are positioned thereby, as appears. The outer edge of the fourth frame strip 20 is not rolled, so as to afford a clear entrance opening for the binder part 10, but does preferably have a slight downward bend at its extremity, as indicated at 24 (Figure 5).

To assemble the device, the two plates 12 and 13, with the transparency 14 between them, are first placed in the binder part 10, and the binder part 11 is then slid into engagement with the part 10 by first engaging the forward flange 17b of binder part 10 under the frame strip 20 of part 11 provided with the slightly downwardly bent edge 24, then entering the two opposite side flanges 17a and 17c of the member 10 into the guideways formed by the two opposite edge rolls 22a and 22c of part 11, and sliding the parts together to the position shown in the drawings, the forward flange 17b on part 10 finally engaging inside the edge roll 22b on part 11, and the slightly bent flange portion 24 of part 11 engaging partially in back of edge roll 18 of part 10 to aid in yieldingly securing the two binder parts against accidental separation.

The extremities of the edge rolls 22a and 22c on part 11 engage the undersides of the side flanges 17a and 17c on part 10 when the upper sides of said flanges are in facial engagement with the side strips 20 of part 11. Preferably, the normal clearance distance between the extremities of edge rolls 22a and 22c and the strips 20 of part 11 is just slightly less than the thickness of the flanges 17a and 17c, so that the edge rolls 22a and 22c will be slightly expanded as the parts are assembled. The clearance between the extremity of the remaining edge roll 22b and the strip 20 opposite thereto may be slightly greater, so as to permit the advance flange 17b of part 10 to slide readily inside the edge roll 22b. Also, by having the plates 12 and transparencies 14 of a slight excess thickness as compared with the depth of the receptacle formed by the binder part 10, the flanges 17a and 17c tend to be forced downwardly against the extremities of the rolled guideway parts 22 of the binder part 11, causing the latter to be very slightly further expanded. The assembly is thus held tightly under a resilient gripping action performed by the slightly expanded edge rolls 22a and 22c.

The rolls 22a, 22b and 22c are preferably of such thickness as to lie substantially in the plane of the frame sides 15 of the binder part 10, so that the assembly is substantially of uniform thickness throughout. This is of particular advantage in feeding the slide binders through the guideway of a projector, where each slide binder is to be moved ahead as a result of edge engagement by the succeeding one, the relatively thick edge rolls assuring that this function will be properly performed, with no slippage of their edge flange parts of adjacent slide binders past one another.

The resilient edge rolls, which will be seen to be formed on all four sides of the finished assembly, serve the additional function of protecting the glass and transparencies in the binder against breakage in the event that the binder is dropped on a hard floor. Among the incidental features of advantage of the binder of the present invention is the fact that the binder part 11 possesses a relatively wide, flat frame portion 30, available for labels or other identifying indicia, while at the same time the overall outside dimensions of the binder are very little greater than the outside dimensions of the positive transparency.

It is of course to be understood that the drawings and description disclose but one illustrative embodiment of the invention, and that various changes in design, structure and arrangement are possible without departing from the spirit and scope of the appended claims.

I claim:

1. A slide binder comprising, in combination: a receptacle frame of thin material having four rectangularly arranged frame sides defining a picture aperture, edge portions turned at right angles to said frame sides to form a plate receiving receptacle, and edge flanges turned outwardly from said edge portions, and a closure frame of thin material having four rectangularly arranged frame sides defining a picture aperture, and recurved flanges projecting laterally from the outer edges of at least two opposite frame sides of said closure frame, said recurved flanges extending laterally away from said frame sides, thence inwardly toward said picture aperture, and thence backwardly toward said frame sides to terminate in edges spaced closely to said frame sides, so as to form guideways adapted to receive and guide the outwardly turned flanges at two opposite edges of said receptacle frame to permit said receptacle frame and closure frame to be slid into assembly with one another by a parallel motion, with the terminal edges of said recurved flanges engaging said outwardly turned flanges on said receptacle frame to resiliently hold the two frame parts in proper assembly.

2. A slide binder comprising, in combination: a receptacle frame of thin material having four rectangularly arranged frame sides defining a picture aperture, edge portions turned at right angles to said frame sides to form a plate receiving receptacle, and an edge flange turned outwardly from each of said edge portions, one of said flanges being wider than the others and being rolled under, and a closure frame of thin material having four rectangularly arranged frame sides defining a picture aperture, an outwardly projecting flange extending from one frame side of said closure frame, and recurved flanges projecting laterally from the outer edges of the three remaining frame sides of said closure frame, the two opposite recurved flanges extending laterally away from said frame sides, thence inwardly toward said picture aperture, and thence backwardly toward said frame sides to terminate in edges spaced closely to said frame sides, so as to form guideways adapted to receive and guide the two outwardly turned flanges on opposite edges of said receptacle frame to permit said receptacle frame and closure frame to be slid into assembly with one another by a parallel motion, with the terminal edges of said recurved flanges engaging said outwardly turned flanges on said receptacle frame to resiliently hold the two frame parts in proper assembly, the remaining of said three recurved flanges on said closure frame being adapted to receive the remaining of said three flanges on said receptacle frame.

DONALD E. DAVIDSON.

REFERENCES CITED

The following references are of record in the file of this patent:

FOREIGN PATENTS

| Number | Country | Date |
|--------|---------|------|
| 493,880 | Great Britain | Oct. 17, 1938 |
| 691,587 | Germany | May 31, 1940 |
| 703,921 | Germany | Mar. 20, 1941 |